(12) United States Patent
Fibaek

(10) Patent No.: US 8,243,025 B2
(45) Date of Patent: Aug. 14, 2012

(54) TACTILE USER INTERFACE

(75) Inventor: Tino Fibaek, Newport (AU)

(73) Assignee: Fairlight.Au Pty. Ltd., Frenchs Forest, NSW (AU)

( * ) Notice: Subject to any disclaimer, the term of this patent is extended or adjusted under 35 U.S.C. 154(b) by 167 days.

(21) Appl. No.: 12/301,991

(22) PCT Filed: Oct. 5, 2006

(86) PCT No.: PCT/AU2006/001463
§ 371 (c)(1),
(2), (4) Date: Apr. 22, 2009

(87) PCT Pub. No.: WO2007/134359
PCT Pub. Date: Nov. 29, 2007

(65) Prior Publication Data
US 2010/0231527 A1  Sep. 16, 2010

(30) Foreign Application Priority Data
May 22, 2006 (AU) ............................. 2006902752

(51) Int. Cl.
*G06F 3/02* (2006.01)
*G09G 5/00* (2006.01)

(52) U.S. Cl. ........................... 345/170; 345/172
(58) Field of Classification Search ............ 345/156, 345/157, 160, 161, 168, 169, 170, 172
See application file for complete search history.

(56) References Cited

U.S. PATENT DOCUMENTS

| | | | |
|---|---|---|---|
| 5,408,060 A | 4/1995 | Muurinen | 200/314 |
| 5,936,613 A | 8/1999 | Jaeger et al. | 345/172 |
| 6,636,203 B1 | 10/2003 | Wong et al. | 345/173 |
| 6,642,919 B1 | 11/2003 | Jaeger et al. | 345/161 |

FOREIGN PATENT DOCUMENTS

| | | |
|---|---|---|
| DE | 19951218 A1 | 4/2001 |
| WO | WO03/080391 | 10/2003 |
| WO | WO2004/091956 | 10/2004 |

OTHER PUBLICATIONS

International Preliminary Report on Patentability on PCT Application PCT/AU2006/001463 mailed Nov. 27, 2008.

*Primary Examiner* — Ricardo L Osorio
(74) *Attorney, Agent, or Firm* — Dov Rosenfeld; Inventek

(57) ABSTRACT

A virtual user interface including: a display screen; a masking means for concealing at least part of said screen and revealing at least one preselected display area; at least one user-actuated control; and control means responsive to said user-actuated control for displaying information on said display area operatively associated with said user-actuated control.

23 Claims, 9 Drawing Sheets

SECTION A-A
SCALE 2:1

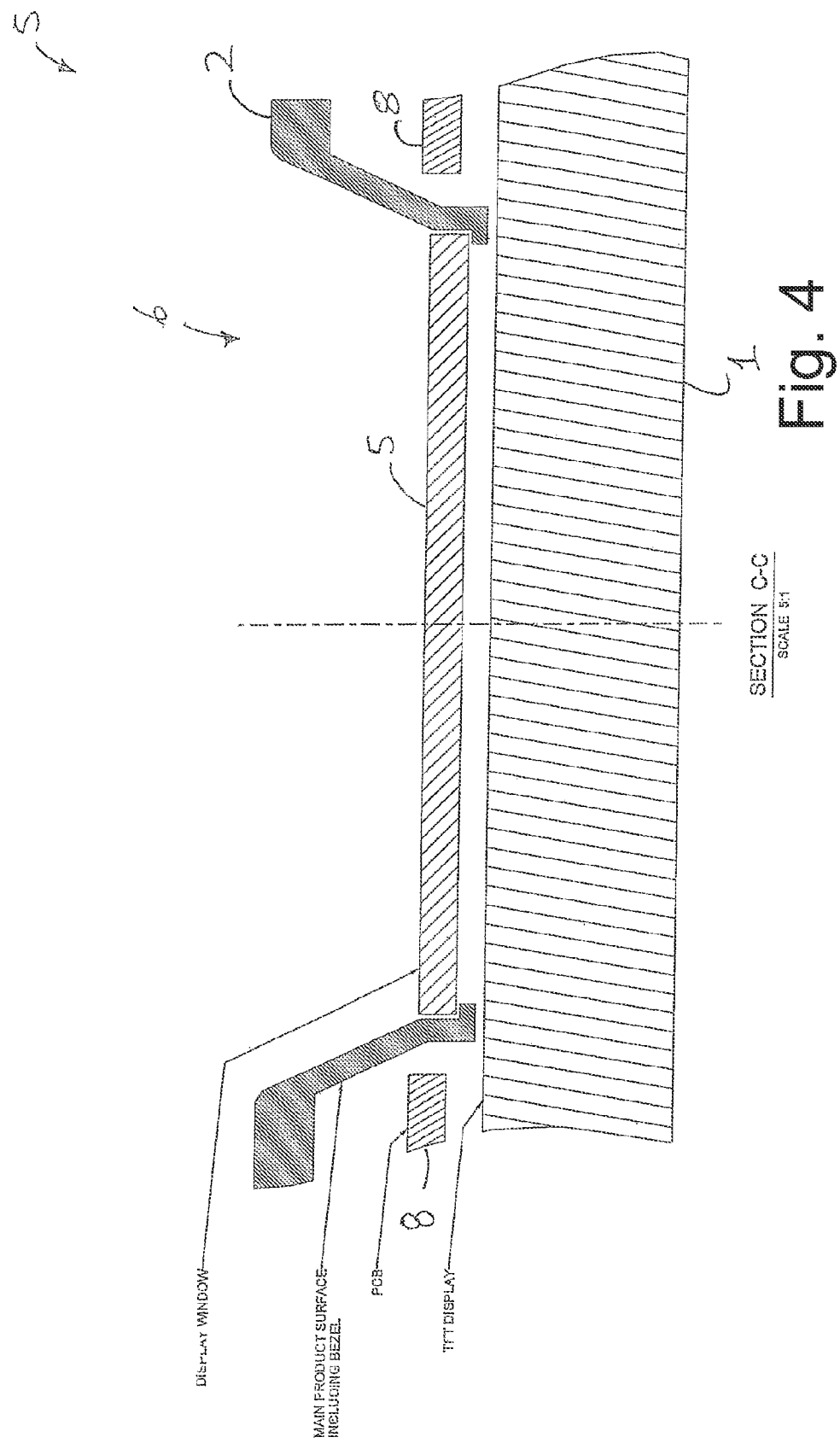

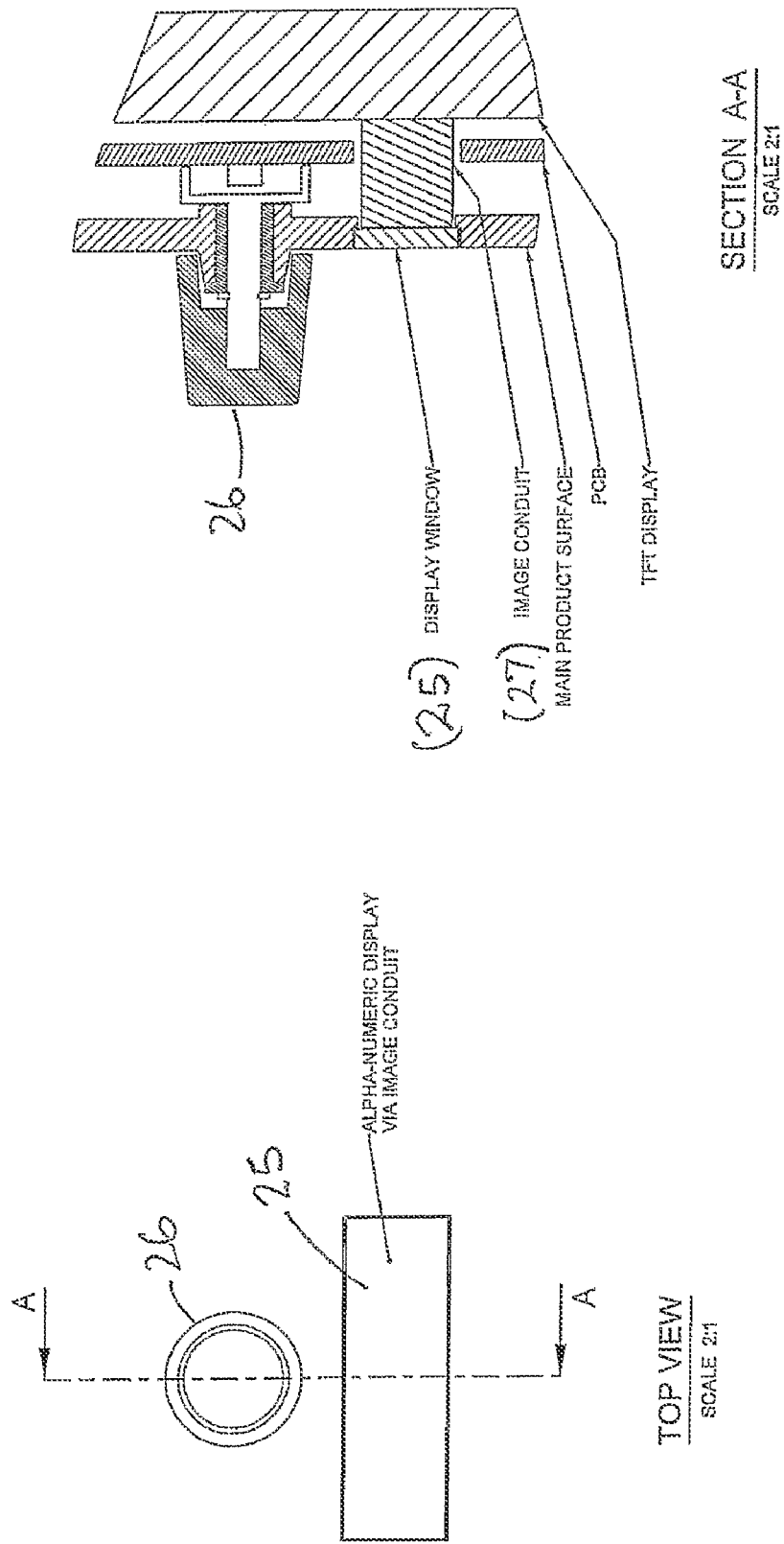

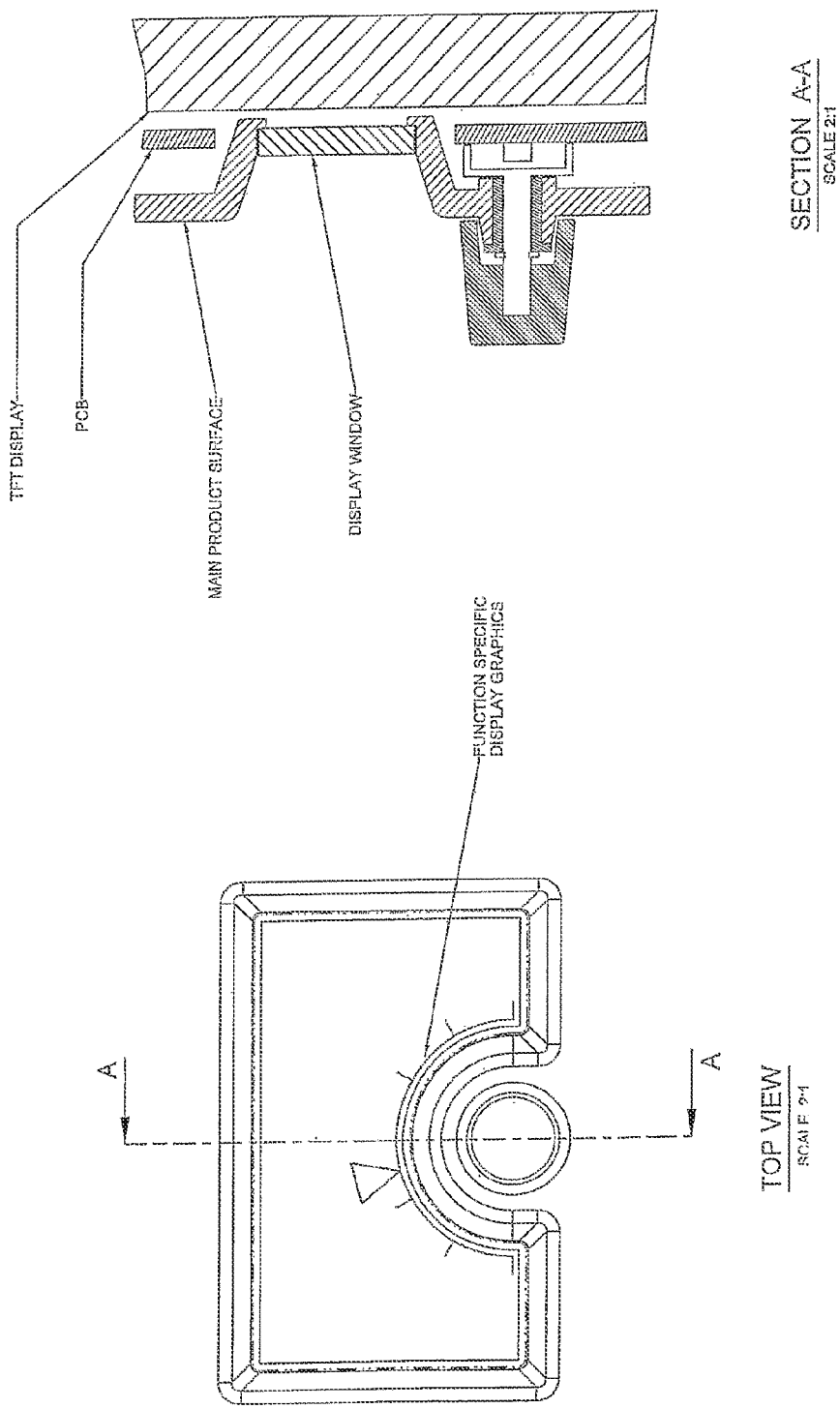

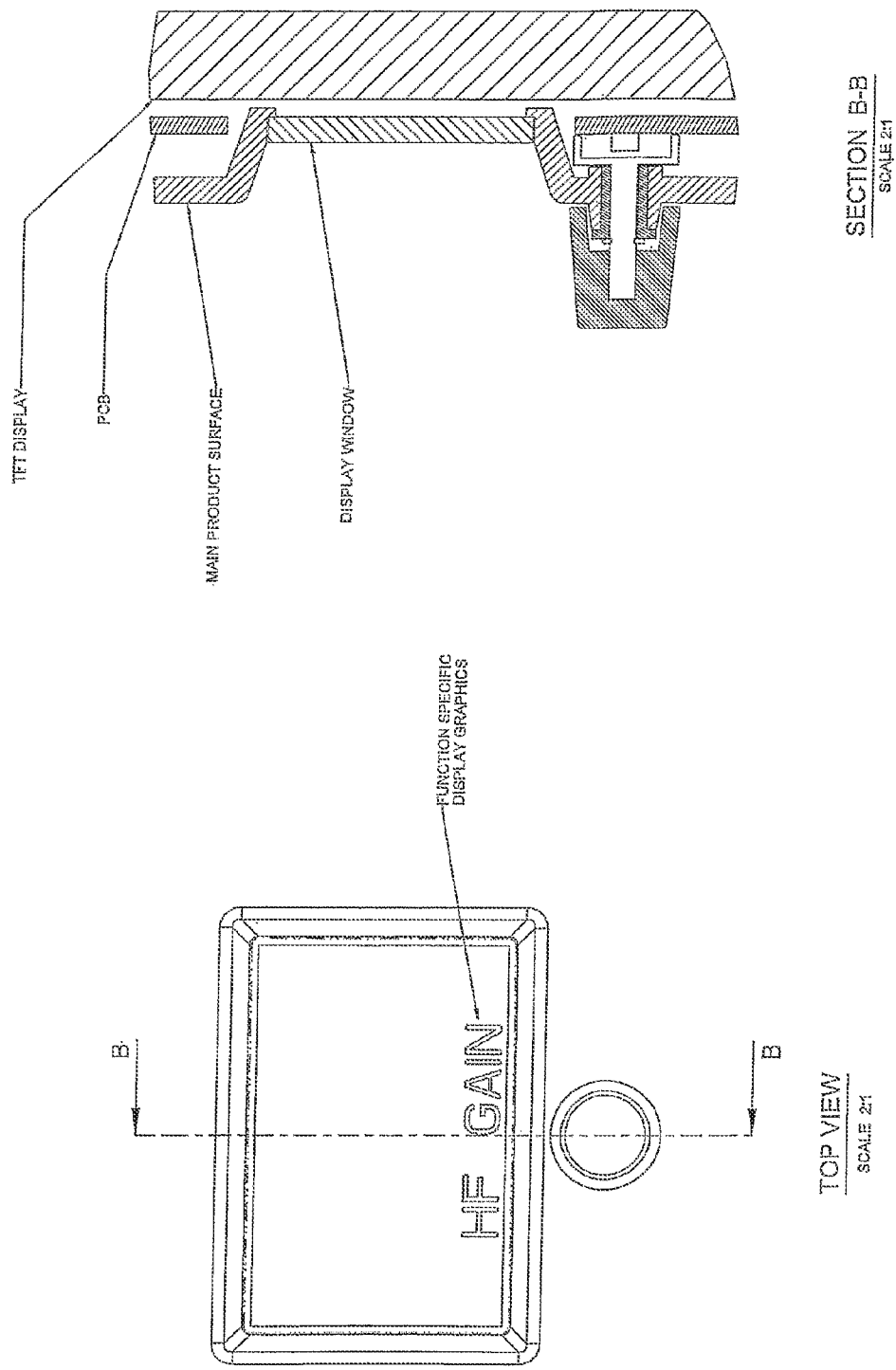

TACTILE USER INTERFACE

RELATED APPLICATIONS

The present invention is a National Filing in the U.S. under 35 USC 371 of International (PCT) Application No. PCT/AU2006/001463, Request filed 5 Oct. 2006, published as WO 2007/134359 A1 on 29 Nov. 2007. The contents of such PCT Application No. PCT/AU2006/001463 are incorporated herein by reference.

International (PCT) Application No. PCT/AU2006/001463 claims priority of Australian Application No. 2006902752 filed 22 May 2006 to Applicant Fairlight.AU Pty Ltd. of Australia. The contents of such Australian Application No. 2006902752 are incorporated herein by reference.

FIELD OF THE INVENTION

The present invention relates to user interface devices and in particular to screen based user interfaces.

The invention has been developed primarily for use as a user interface device for control of media applications such as audio and video and will be described hereinafter with reference to this application. However, it will be appreciated that the invention is not limited to this particular field of use and applies where any user interface to equipment is required.

BACKGROUND OF THE INVENTION

Any discussion of the prior art throughout the specification should in no way be considered as an admission that such prior art is widely known or forms part of the common general knowledge in the field.

User interfaces for interaction with machinery are well know. From computer keyboard and display to large music panel type devices, these arrangements are in common use in society. Various advances have also been made. For example, a known user interface devices includes the prototype Optimus keyboard. Each of the keys on the Optimus keyboard has a discrete display showing the function of the key at that moment. When the function of the key changes, the display on the key changes to the new function of that key. This helps the user to quickly adjust to controlling new programs or devices however it is relatively expensive technology limited to depressible OLED keys.

SUMMARY OF THE INVENTION

It is an object of the invention in its preferred form to provide a virtual user interface with adaptable display means consisting of relatively inexpensive technology.

According to a first aspect of the present invention there is provided a virtual user interface including:

a display screen;

masking means for concealing at least part of the screen and revealing at least one preselected display area;

at least one user-actuated control; and control means responsive to the user-actuated control for displaying information on the display area operatively associated with the user-actuated control.

Preferably, one display area is a display window and one user-actuated control is a switch for manipulating information displayed on the display window.

Preferably, another display area is a switch display for indicating the current function of the switch. The switch display is preferably instantaneously changeable in correspondence with a change in the function of the switch. Preferably, there is an image conduit for conveying information from the switch display to a location spaced from the screen. The image conduit preferably includes a plurality of optical fibres. Preferably, switch includes a translucent cap adjacent one end of the image conduit for displaying the information from the image conduit.

Preferably, the control means is mounted on a printed circuit board (PCB). The switch is preferably depressible mounted on the PCB.

Preferably, the switch is located directly above the switch display. The switch preferably includes a silicon keymat attached to the cap, the keymat including at least one primary electronically conductive switch contact such that depression of the cap causes electrically transmissive contact between the primary switch contact and a corresponding base contact on the PCB for activating the function displayed on the switch display. Preferably, the keymat includes at least one secondary electronically conductive switch contact at a different height from the primary switch contact such that the velocity of depression of the switch can be measured. Preferably, the primary and secondary switch contacts are conductive carbon pills.

Preferably, one user-actuated control is a knob for manipulating the information displayed on the display window. The knob is preferably rotatably mounted. Preferably, the knob includes indicating means engaging a sensor on the PCB for translating rotational movement of the knob to the PCB. The indicating means are preferably a pair of light emitting diodes (LED's) and receivers.

Preferably, one display area is a knob display for indicating the current function and status of the knob. The knob display is preferably adjacent the knob. Preferably, there is included a light conduit formed by a slot in the PCB directly above the knob display for conveying information from the knob display to a location spaced from the screen. The knob is adjacent the display window such that a portion of the display window closest to the knob is the knob display.

Preferably, one user-actuated control is a touch, position or pressure sensor mounted over the display window.

Preferably, the masking means includes a protective product surface.

BRIEF DESCRIPTION OF THE DRAWINGS

A preferred embodiment of the invention will now be described, by way of example only, with reference to the accompanying drawings in which:

FIG. 4 is a sectional view taken on the line C-C of FIG. 1;

FIG. 7 is a top view of a second arrangement of a knob and knob display;

FIG. 8 is a sectional view taken on the line A-A of FIG. 7;

FIG. 9 is a top view of a third arrangement of a knob and knob display;

FIG. 10 is a sectional view taken on the line A-A of FIG. 9;

FIG. 11 is a top view of a fourth arrangement of a knob and knob display;

FIG. 12 is a sectional view taken on the line A-A of FIG. 11; and

PREFERRED EMBODIMENT OF THE INVENTION

Figure 1:
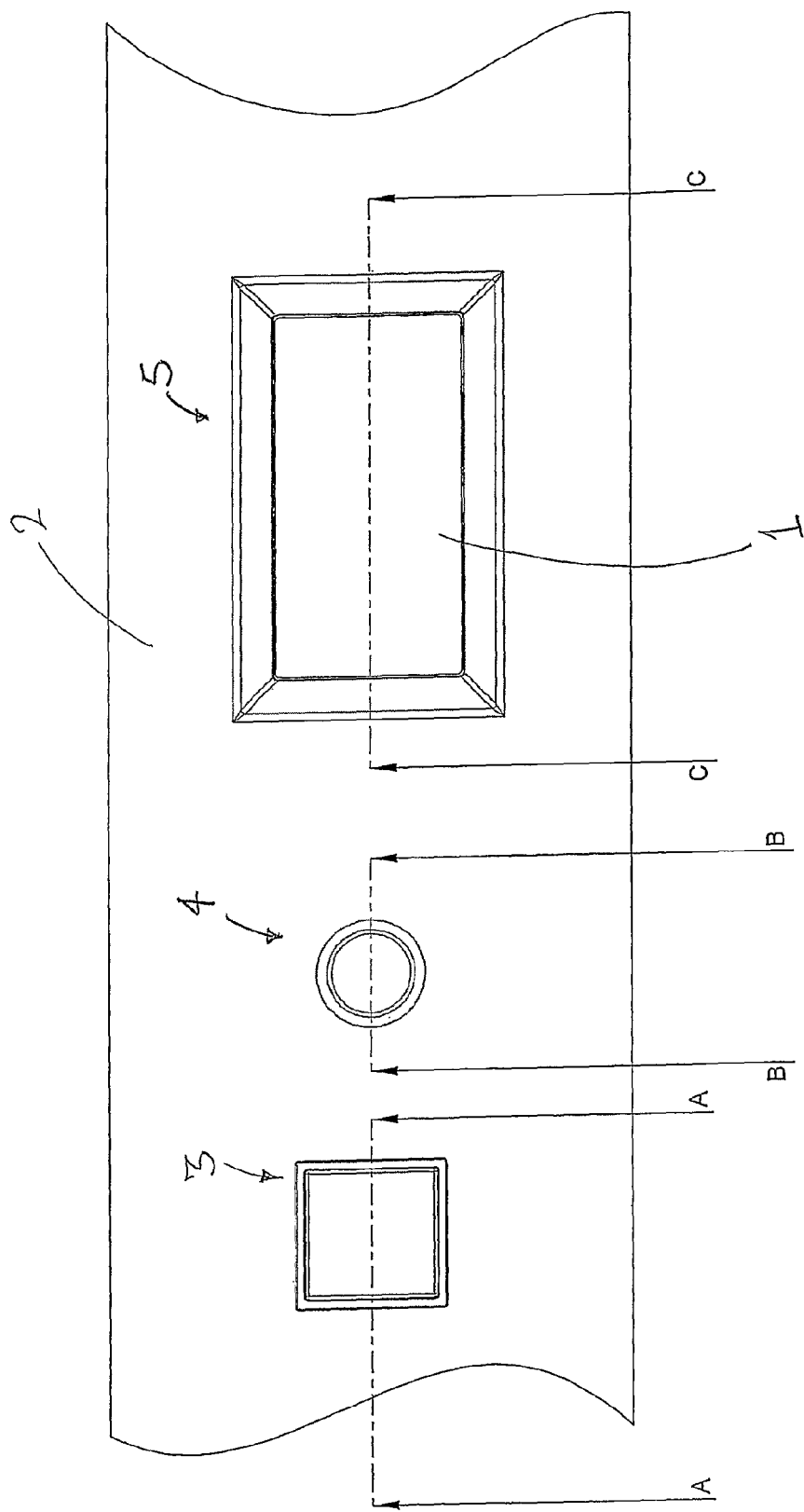
FIG. 1 is a top view of a portion of virtual user interface according to the invention.

Referring to the drawings, the virtual user interface includes a thin film transistor screen covered by a masking means for concealing at least part of the screen and revealing at least one preselected display area. A control means is located adjacent the screen and is responsive to the user-actuated control for displaying information on the display area operatively associated with the user-actuated control. The control means is mounted on a printed circuit board (PCB) having preselected holes and slots cut in to house user-actuated controls and display areas. The printed circuit board also forms part of the masking means.

One of the display areas is a display window and one user-actuated control is a switch for manipulating information displayed on the display window. Another display area is an instantaneously changeable switch display including an image conduit having a plurality of optical fibres for conveying the current switch function from the switch display to a location spaced from the screen. The switch is mounted to the PCB having a translucent cap adjacent one end of the image conduit for displaying the information from the image conduit. The switch is located directly above the switch display.

The switch includes a silicon keymat attached to the cap, the keymat having one set of primary electronically conductive switch contacts in the form of conductive carbon pills. The arrangement is such that depression of the cap causes electrically transmissive contact between the primary carbon pills and a corresponding base contact in the form of copper tracks on the PCB thereby activating the function displayed on the switch display. Alternatively, the carbon pill creates an electrically transmissive contact between two tracks on the PCB. Furthermore, the keymat can have a set of secondary conductive carbon pills arranged at a different height to the primary carbon pills such that the velocity of depression of the switch can be measured and used as an additional parameter.

In other less-preferred configurations, the switch may be slidably mounted between two or more positions. The switch display may also be located adjacent the switch.

Another user-actuated control is a knob rotatably mounted on the PCB for manipulating the information displayed on the display window. The knob includes indicating means in the form of a pair of light emitting diodes (LED's) engaging a sensor on the PCB for translating rotational movement of the knob to the PCB. Furthermore, an optional touch sensor circuit could be connected to the knob.

Figure 6:
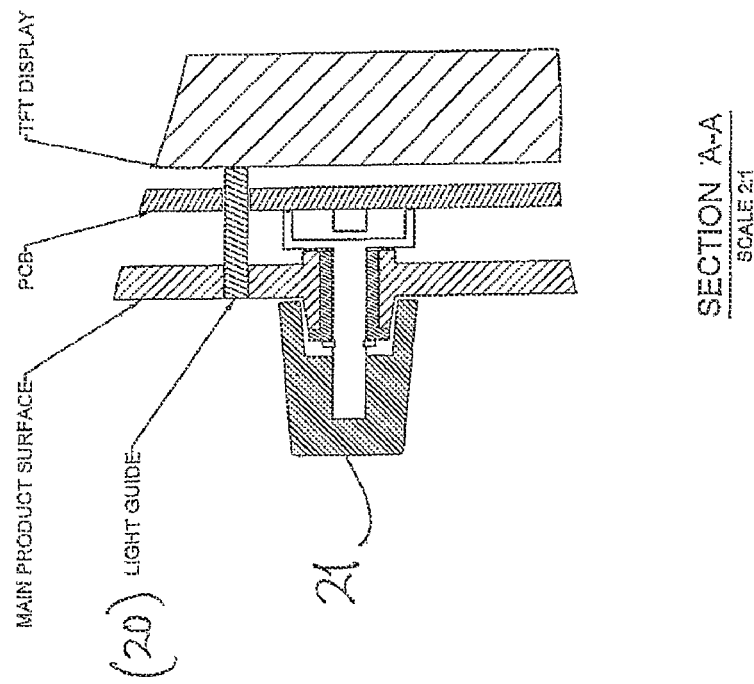
FIG. 6 is a sectional view taken on the line A-A of FIG. 5.

Another display area is a knob display adjacent the knob for indicating the current function and status of the knob. A light conduit is formed by a slot in the PCB directly above the knob display for conveying information from the knob display to a location spaced from the screen. One arrangement has another display window formed substantially surrounding the knob as shown in FIG. 6. An alternative configuration has the knob adjacent the display window such that the knob display is the portion of the display window closet to the knob seen in FIG. 8. Other functional indicators for the knob include light guides disposed about the knob as shown in FIG. 10 or an alphanumeric display adjacent the knob as shown in FIG. 11.

A third form of user-actuated control is a touch sensor mounted over the display window. This clear sensor allows chosen items on the display window to simply be pointed to and engaged with a finger or other pointing article to manipulate the displayed information.

The masking means includes a protective product surface typically an opaque moulded plastics shape. The product surface contains holes and slots in correspondence with the PCB. Suitable alternative protective materials for the product surface include sheet metal, punched and bent into shape.

It will be appreciated that the illustrated virtual user interface has adaptable display means consisting of relatively inexpensive technology. The TFT-Based User Interface Device provides a flexible and inexpensive architecture for creating user interface devices for real-time control of media applications such as audio and video. It incorporates the three most important user controls in media applications, namely switches, rotary knobs and display areas, and it provides the graphical support needed for labelling and tallying the actions of these devices. Because of the built-in computer graphics, the switches and rotary knobs can be assigned different functions depending on operational context, and users can easily see what function is current for each device. In addition, the graphics can tally the values of parameters controlled by switches and rotary knobs, in close proximity to the control itself. The combination of these facilities reduces the surface area needed to design a user interface for a specific purpose, thus lowering its cost and enhancing its value in environments such as production studios, where real estate is at a premium.

Turning initially to FIG. 1, there is illustrated a TFT-Based User Interface Device of the preferred embodiment which consists of an underlying TFT screen 1 with a number of objects mounted on top of it. The screen 1 displays computer-generated graphics, while the objects mounted on top provide three types of user control:

1. Tactile Switch with programmable inset display 3
2. Rotary Knob with optional display 4
3. Display Window 5

This device makes use of the fact that the underlying TFT screen can be programmed with complete flexibility, so that one part 5 of it can appear to the user to be a self-contained display device, while others form other displays and labels. The device can also re-program itself according to the task that the user is currently undertaking, by changing the labelling of switches accordingly. Further, groups of controls can be created, by using different colours of backgrounds. Internationalisation can easily be achieved, where keys can show letters & symbols in the native language. Icons can be used instead for text, for a more intuitive display. The core components listed above can themselves be used in different physicals, application specific, configurations. One low-cost TFT device, coupled with standard sets of components comprising the three user controls, can form the hardware basis of any user interface design, simply by changing the placement of those components. The preferred embodiment provides for increased speed of operation and better ergonomics through switches always being close at hand.

Figure 2:
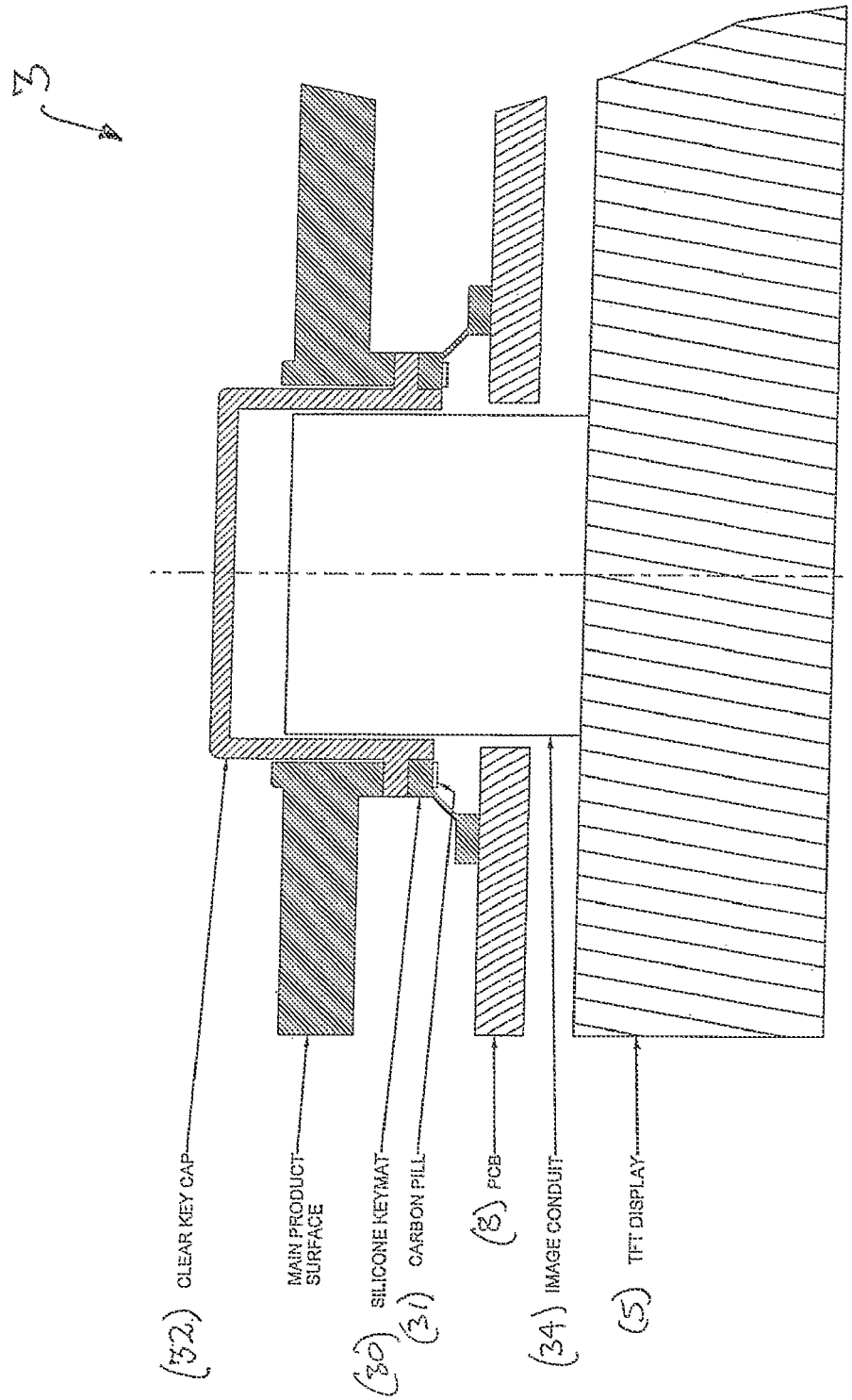
FIG. 2 is a sectional view taken on the line A-A of FIG. 1.

Turning now to FIG. 2 there is shown a sectional view of the preferred embodiment through the line C-C of FIG. 1 revealing the major parts of the preferred embodiment. These include:

TFT Screen 1

The TFT screen is a standard device, available in a number of sizes and pixel resolutions. It is capable of displaying images with thousands of colours, and redrawing them fast enough to achieve smooth animation.

Product Surface 2

The product surface is typically an opaque moulded plastic shape, mounted above the TFT screen 1. It contains holes e.g. 6 where switches 3, knobs 4 and display windows 5 can be mounted, and can be moulded where needed for assembly of these components. Alternative implementations could use sheet metal, punched and bent into shape.

Printed Circuit Board 8

The printed circuit board is used to mount the switch and rotary knob electronics. It has holes and slots cut in it where needed to reveal the TFT screen and mount components such as the switch assembly light conduits. The printed circuit board 8 contains copper tracks used by the Switch Assembly, and the LEDs and their corresponding sensors, which are used by the Rotary Knob assembly. It may also contain power supplies, graphics drivers, processing for the sensor decoding, and interfacing to a host computer.

Display Window 5

Figure 3:
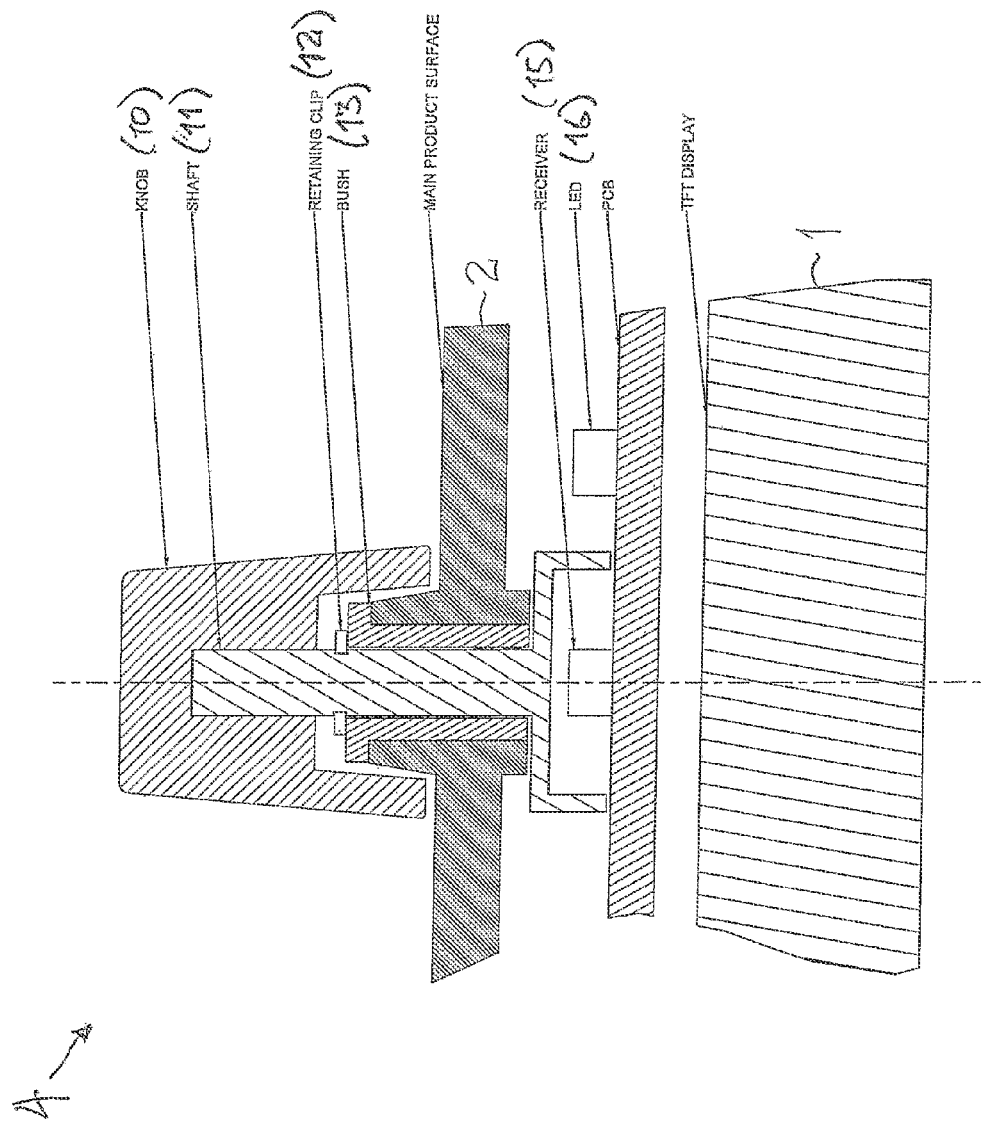
FIG. 3 is a sectional view taken on the line B-B of FIG. 1.

The Display Window frames and reveals a part of the TFT screen, to be used as a viewing area. Its function is to display needed contextual information to the user, including parameter values, mode statuses, typed input, graphic display of media content such as audio waveforms and transfer function graphs, and any other information needed by the user. Part of the Display Window forms an opaque frame around the Viewing Area (FIG. 3). This part is moulded into the Product Surface. The other part is a clear plastic covering which protects the surface of the TFT screen and allows light to pass through. Optionally, the display window can be fitted with a touch-sensor. Different established designs of touch overlays are commercially available, including resistive, capacitive and acoustic.

Particular devices utilised as part of the display will now be described in more detail.

Rotary Knob Assembly 4

The Rotary knob assembly 4 mounts at any desired position in and is held by the Product Surface. It combines a simple manually operated turning mechanism with a rotation detection system. The detail of the Rotary Knob Assembly 4 is shown in FIG. 3. The assembly includes an outer knob 10 which is interconnected to a shaft 11 which is held in place within bush 13 by means of retaining clip 12. The degree of rotation is monitored by two LEDs e.g. 16, shining through slots in the cylindrical base of the shaft 11 and their respective receivers. These are detected by a sensor 15 mounted on the Printed Circuit Board, producing a characteristic square wave output pattern which can be used to detect the direction and angle of any rotational movement.

Figure 5:
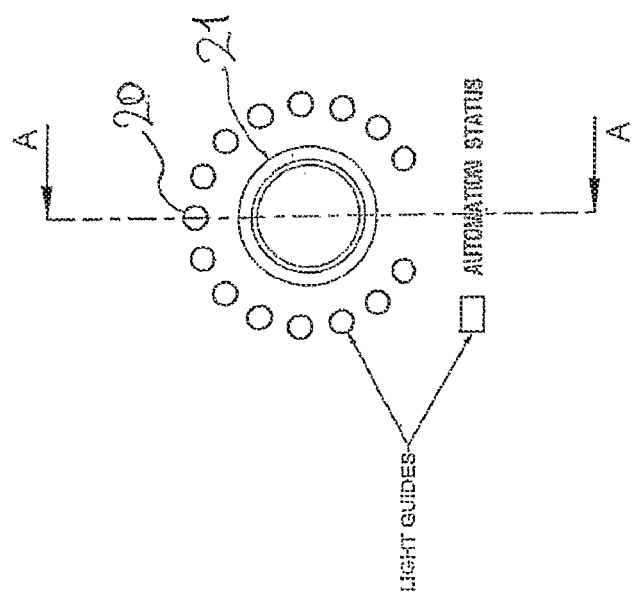
FIG. 5 is a top view of one arrangement of a knob and knob display.

If desired, the Printed Circuit Board and Product Surface can have slots or other shapes routed out to allow light from the TFT screen to travel upwards through a light conduit and appear in proximity to the rotary knob. This can be used to indicate the status and value of the parameter being controlled by the knob at any time. A first such arrangement is illustrated in FIG. 5 and FIG. 6 wherein a series of light guides 20 are arranged around a rotary knob 21. FIG. 7 and FIG. 8 illustrates a second example where a display is provided adjacent the knob 26. As will be discussed in more detail hereinafter, the display includes an image conduit 27, taking the image from the TFT to the display window.

Similarly the knobs can be mounted at the edge of a Display Window, where an adjacent small area can be devoted to depiction of the knob's contextual function, status and value at any time. Such an arrangement is illustrated in FIG. 9 to FIG. 12.

Switch Assembly 3

Returning to FIG. 1, there is illustrated a Switch Assembly 3. The switch assembly is also illustrated in section in FIG. 2. The switch operation uses a single silicon keymat 30 with conductive carbon pills 31, into which is mounted a clear plastic Key Cap 32 that is pressed by the user. The downward movement causes the carbon pill to reach and make contact with copper tracks on the Printed Circuit board 8, completing an electrical circuit.

The Image Conduit 34 is a block of material filled with parallel optic fibres, which is located in contact with the TFT screen 5. Light from the screen travels upwards to the top of the Image Conduit, which is housed inside the clear Key Cap 32. Thus it appears that the light is at the top of the key. The Image Conduit remains in a fixed position, in contact with the TFT screen, even while the Key Cap moves up and down. This ensures that the light entering it is strong and focussed. The vertical movement of the Key Cap 32 is kept to the minimum needed for acceptable user "feel", so that the lighted top of the Image Conduit is never too far below its top. This ensures that the light image can easily by read, regardless of the user's viewing position.

The small area of the TFT 5 immediately below the Image Conduit 34 can be programmed to create a label for the switch. Its text or iconic content may be used to indicate the switch function in any operational context, while its colouring and flash pattern may be used to indicate ON/OFF status, automation status, critical condition or any other parameters required by the application.

Figure 13:
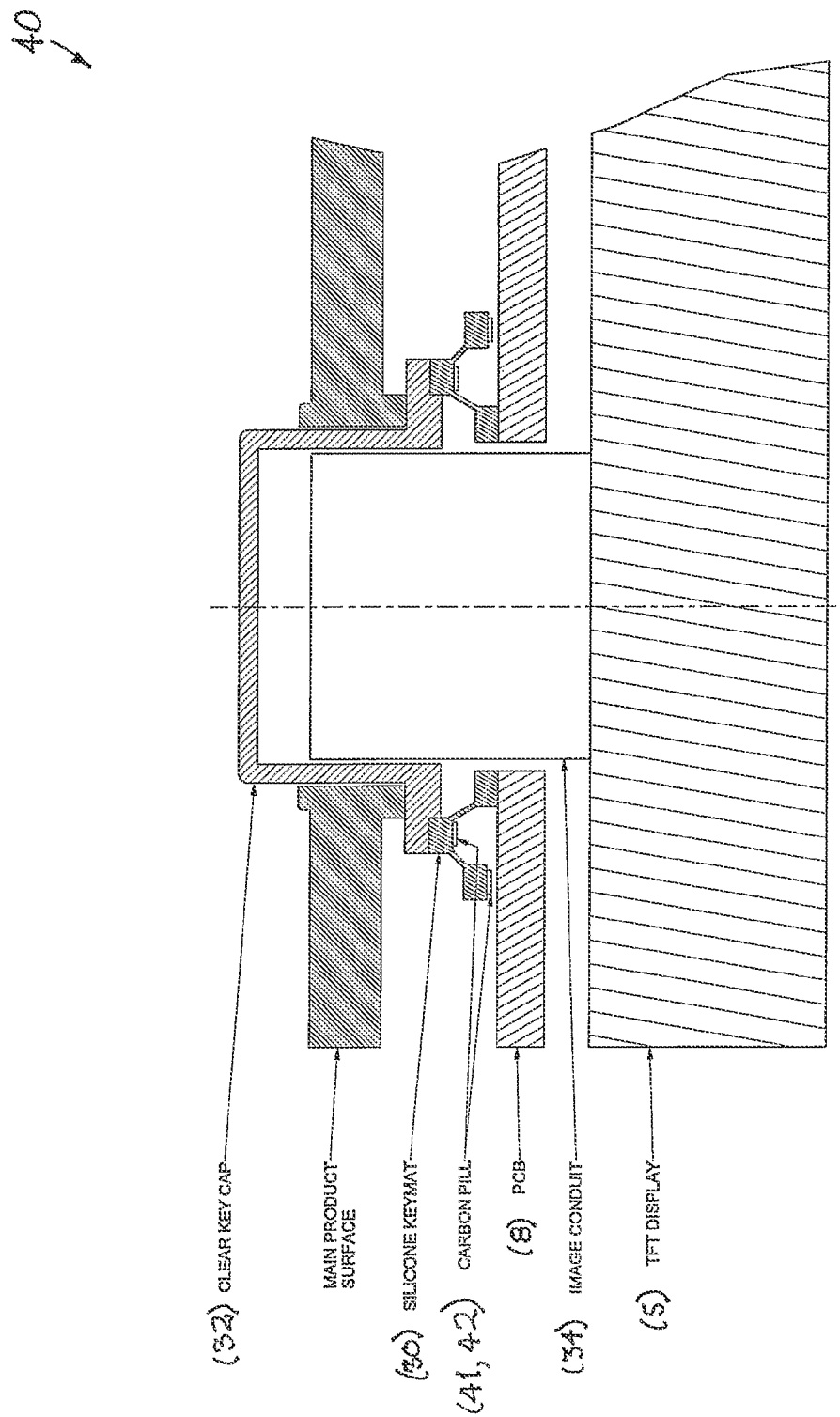
FIG. 13 is a sectional view of a modified embodiment having key velocity measurement capabilities.

Optionally, the switch 3 can be fitted with a second set of carbon pills, offset in height to the original. This arrangement allows for the velocity of the key depression (and release) to be measured, which can be used as a additional input parameter, for instance if the key is being used to trigger a sound, in which case the velocity can be used to control the loudness of the sound. An example of this modified form of arrangement is illustrated 40 in FIG. 13 wherein two sets of pills 41, 42 are provided. Upon depression, a first pill 41 makes contact with a trace on the PCB 8. This is followed by a second pill 42 later making contact with a separate trace on the PCB 8.

Although the invention has been described with reference to specific examples, it will be appreciated by those skilled in the art that the invention may be embodied in many other forms.

The claims defining the invention are as follows:

1. An apparatus configured as a virtual user interface, the apparatus comprising:
   a display screen;
   one or more user-actuated control elements, wherein one of said one or more user-actuated control elements is a switch comprising a translucent cap;
   a masking element configured to conceal at least part of said screen and reveal one or more display areas, wherein one of said one or more display areas is a switch display for displaying a current function of said switch, the switch display viewable through said translucent cap;
   an image conduit disposed between said display screen and said translucent cap, wherein said image conduit is configured to convey information from said switch display to the user at a location spaced from said screen; and
   a controller responsive to a user's actuating said one or more user-actuated control elements and configured to cause displaying of information on said one or more display areas including displaying information corresponding to the current function of the switch on the switch display, the controller responsive to the user's actuating of said switch to carry out the current function displayed on the switch display,
   wherein said translucent cap is disposed adjacent to one end of said image conduit for displaying said information from said image conduit to the user.

2. An apparatus according to claim 1 wherein one of said display areas is a display window and one of said user-actuated control elements is configured to manipulate information displayed on said display window.

3. An apparatus according to claim 1, wherein said switch display is changed in correspondence with a change in the function of said switch.

4. An apparatus according to claim 1, wherein said image conduit includes a plurality of optical fibers or an arrangement of lenses.

5. An apparatus according to claim 1 wherein said controller is mounted on a printed circuit board (PCB).

6. An apparatus according to claim 5 wherein said PCB forms at least part of said masking element.

7. An apparatus according to claim 5 wherein said switch is mounted on said PCB.

8. An apparatus according to claim 7 wherein said switch is depressible mounted on said PCB.

9. An apparatus according to claim 8 wherein said switch is located directly above said switch display.

10. An apparatus according to claim 9 wherein said switch includes a silicon keymat attached to said cap, said keymat including at least one primary electronically conductive switch contact such that depression of said cap causes electrically transmissive contact between said primary switch contact and a corresponding base contact on said PCB for activating the function displayed on said switch display.

11. An apparatus according to claim 10 wherein said keymat includes at least one secondary electronically conductive switch contact at a different height from said primary switch contact such that the velocity of depression of said switch can be measured.

12. An apparatus according to claim 11 wherein said primary and secondary switch contacts are conductive carbon pills.

13. An apparatus according to claim 5 wherein one of said user-actuated control elements is a knob configured to manipulate said information displayed on said display window.

14. An apparatus according to claim 13 wherein said knob is rotatably mounted.

15. An apparatus according to claim 14 wherein said knob includes an indicator element engaging a sensor on said PCB configured to translate rotational movement of said knob to said PCB.

16. An apparatus according to claim 15 wherein said indicator element includes a pair of light emitting diodes (LEDs) and corresponding receivers.

17. An apparatus according to claim 16 wherein one said of display areas is a knob display configured to indicate the current function and status of said knob.

18. An apparatus according to claim 17 wherein said knob display is adjacent to said knob.

19. An apparatus according to claim 17 wherein said knob is adjacent to said display window such that a portion of said display window closest to said knob is said knob display.

20. An apparatus according to claim 16 including a light conduit formed by a slot in said PCB directly above said knob display, said light conduit configured to convey information from said knob display to a location spaced from said screen.

21. An apparatus according to claim 1 wherein one of said user-actuated control elements is a touch sensor mounted over said display window.

22. An apparatus according to claim 1, wherein said masking element includes a protective product surface.

23. An apparatus for a user interface, the apparatus comprising:
    a display screen;
    one or more user-actuated control elements, wherein one of said one or more user-actuated control elements is a switch comprising a translucent cap;
    means for concealing at least part of said screen and revealing one or more display areas, wherein one of said one or more display areas is a switch display for displaying a current function of said switch and viewable by a user through said translucent cap;
    an image conduit disposed between said display screen and said translucent cap, wherein said image conduit is configured to convey information from said switch display to the user at a location spaced from said screen; and
    control means operatively associated with said user-actuated control elements, responsive to a user's actuating one of said user-actuated control elements, and configured to cause displaying of information on said one or more display areas including displaying information corresponding to the current function of the switch on the switch display, the control means responsive to the user's actuating of said switch to carry out the current function displayed on the switch display,
    wherein said translucent cap is disposed adjacent to one end of said image conduit for displaying said information from said image conduit to the user.

* * * * *